May 22, 1934.   G. E. NELSON   1,959,962
CUTTING DEVICE
Filed Aug. 29, 1932
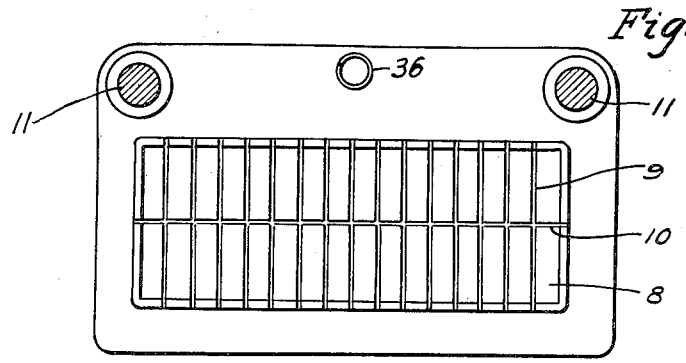
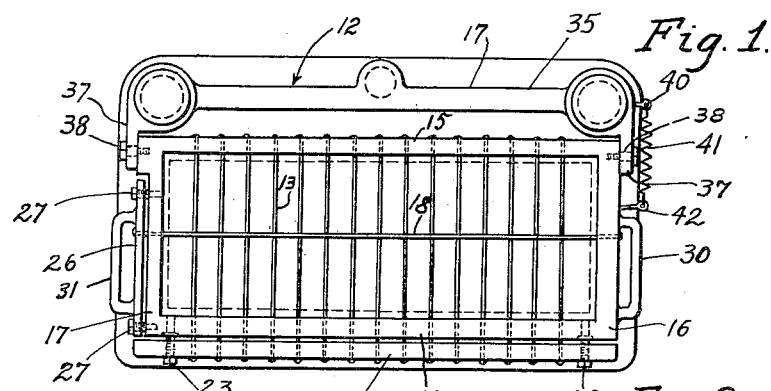
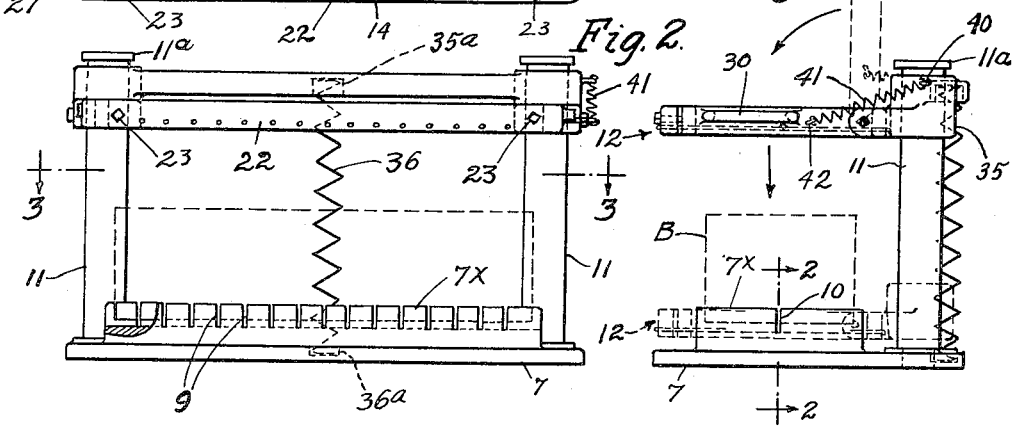
INVENTOR:
Gustaf E. Nelson
BY Rob't. D. Pearson
ATTORNEY Patented May 22, 1934

1,959,962

UNITED STATES PATENT OFFICE 1,959,962

CUTTING DEVICE

Gustaf E. Nelson, Los Angeles, Calif.

Application August 29, 1932, Serial No. 630,882

2 Claims. (Cl. 31—30)

This invention relates to a butter cutting device designed to separate a mass of butter into the small pieces customarily furnished for individual use.

An object of the invention is to provide a butter cutting device of the character stated wherein the cutting elements will pass completely through the mass of butter which is being subdivided and will thereupon free themselves from the butter so that a clear-cut complete severance of the butter will be effected.

More specifically the invention pertains to a butter cutting device of that class wherein a plurality of small wires or connections are used for cutters and wherein a piece of butter of considerable size is simultaneously cut into a multiplicity of small pieces for individual use.

Although more specifically intended for use in cutting butter the invention may be used to advantage in subdividing pieces of any kind of material of a semi-solid nature like butter.

Other objects, advantages and features of the invention may hereinafter appear.

Referring to the accompanying drawing which illustrates what is at present deemed to be a preferred embodiment of the invention, Fig. 1 is a plan view of the complete device.

Fig. 2 is a front view of the complete device on part section on line 2—2 of Fig. 4.

Fig. 3 is a transverse section through the upper portion of the frame taken on line 3—3 of Fig. 2.

Fig. 4 is an end elevation of the complete device, two of the operative positions being indicated in dotted lines.

Referring in detail to the drawing, the stationary portion of the device comprises a base plate 7 which is provided with a substantially flat surface or table portion 8 wherein is formed a plurality of equally spaced transverse grooves 9 which are intersected by one or more longitudinal grooves, a single longitudinal groove 10 located in the mid-width of the surface 8 being shown in the illustrated embodiment of the invention. Said surface 8 is formed upon the base plate 7 which at one side is provided with two upstanding guide posts 11 the purpose of which will be described later. An upstanding marginal flange 7ˣ is provided upon the base plate 7, the grooves 9 and 10 subdividing said flange as shown in Figs. 2 and 3.

With the stationary portion of the device which has been described cooperates a multiple cutter member 12 which is provided with a plurality of preferably equally spaced transversely extending wires or other connections 13 which are stretched across the side pieces 14 and 15 of the cutter frame. Said cutter frame is also provided with the end pieces 16 and 17 which serve to support under tension one or more longitudinally extending cutter connections, a single cutter wire 18 at the mid-width of the frame being shown in the drawing.

The cutter member 12 forms an open frame across which are stretched the cutter connections 13 which are shown in the drawing as small wires, but it is to be understood that non-metallic or other suitable cutting connections may be used in place of the wires without departing from the invention as defined by the claims. The end portions of each wire shown passes through apertures provided for them in the side pieces 14 and 15, one end portion of each wire also extending through a tension bar 22. Each end portion of this tension bar is provided with a screw threaded aperture through which extends a tension bolt 23, these bolts being screwed down upon the outer surface of the adjacent piece or bar 14 in order to create the proper tension in each of the transverse wires or connections 13.

In order to keep the cutter wires 18 under proper tension said wire has one end thereof secured to the frame piece 16 and the other end portion thereof extending loosely through the end piece 17 at the other end of the frame. The last mentioned end of the wire is secured to a tension bar 26, there being at each end of said a tension screw 27, which has a screw threaded connection with said bar, each of said screws having a reduced end portion which is seated in a socket provided therefor in the bar 17.

The cutter 12 is preferably provided at one end with a handle 30 and at its other end with a handle 31, the latter handle being shown as formed upon the tension bar 26.

The cutter member is swingingly mounted upon a carriage 35 which is of an elongated character and is provided at each end with an aperture which has a working fit upon the post 11 at that end of the device. At about the mid-length of the carriage it is provided with a downwardly directed seat 35ª which receives the upper end of a compression spring 36, the lower end of said spring being seated in a socket 36ª in the base plate.

At one side of each end of said carriage 35 is provided a hanger arm 37 which, by means of pivot pins or screws 38 is pivotally connected with the corner portions of the adjacent side of the cutter frame. The carriage is also provided above the pivotal mounting thereof with a pin or stud 40 to which is secured one end of a tension spring 41, the other end of said tension spring being secured to a pin or stud 42 carried by the end piece 16 of the cutter frame. The compression spring 36 tends to move the entire cutter frame upwardly and at the same time the tension spring 41 tends to swing said frame to the upright position indicated in dotted lines in Fig. 4.

Each post 11 is provided around its upper end with a stop flange 11a to limit the upward movement of the carriage 35.

In the operation of the device, the parts being in the position shown in full lines in Fig. 4 with a piece of butter in place as indicated in dotted lines at B, the operator will press the entire cutter member 12 downwardly against the opposition of the compression spring 36 until all the cutter wires 13 and 16 have been forced through the butter and have passed downwardly to the bottom of the grooves provided for them in the base portion of the device. The operator will then, while continuing to hold down the cutter member in its most depressed position, will with one hand remove the butter in its subdivided condition from the base portion of the device, whereupon he will release his hand from the cutter member 12, allowing the spring 36 to restore said member to the upper position shown in dotted lines in Fig. 4, whereupon the device is ready to perform another cutting operation. Owing to the fact that the compression spring 36 is located midway between the guide posts 11, the frictional opposition is balanced and effective operation of the spring is insured.

When the cutter member 12 reaches its lowest position it telescopes over the upstanding flange 7x of the base member 7 and thereby insures that the cutter wires completely sever the mass B of the butter.

I claim:

1. A cutting device comprising a base portion having a substantially flat surface to be engaged by a piece of substance to be cut, a cutter member having a plurality of cutting connections which are constructed and arranged to substantially engage said surface after being operated to perform their cutting function, guide posts carried by said base member, and an elongated carriage to which said cutter member is hinged, said carriage having guide ways through its end portions through which said guide posts extend to guide the movements of the cutter member toward and from said surface.

2. A cutting device comprising a base portion having a raised substantially flat surface to be engaged by a piece of substance to be cut, there being a plurality of grooves in said surface, a cutter member having a plurality of cutting connections which are constructed and arranged to be seated in said grooves after being operated to perform their cutting function and to be brought into the grooves of said raised surface, guide posts carried by said base member, and an elongated carriage to which said cutter member is hinged, said carriage having guide ways through its end portions through which said guide posts extend to guide the movements of the cutter member toward and from said grooved surface, said cutter member being arranged to telescope over the raised grooved portion of said base member to bring the cutting connections into the grooves thereof.

GUSTAF E. NELSON.